(12) United States Patent
Innes

(10) Patent No.: US 11,090,868 B2
(45) Date of Patent: Aug. 17, 2021

(54) THREE-DIMENSIONAL PRINTING SYSTEM WITH RECIRCULATING AIR HANDLING SYSTEM

(71) Applicant: 3D Systems, Inc., Rock Hill, SC (US)

(72) Inventor: Eric M. Innes, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 86 days.

(21) Appl. No.: 16/429,311

(22) Filed: Jun. 3, 2019

(65) Prior Publication Data

US 2019/0366641 A1 Dec. 5, 2019

Related U.S. Application Data

(60) Provisional application No. 62/680,370, filed on Jun. 4, 2018.

(51) Int. Cl.
| | |
|---|---|
| *B29C 64/35* | (2017.01) |
| *B29C 64/393* | (2017.01) |
| *B29C 64/112* | (2017.01) |
| *B33Y 50/02* | (2015.01) |
| *B33Y 30/00* | (2015.01) |

(Continued)

(52) U.S. Cl.
CPC ............ *B29C 64/35* (2017.08); *B29C 64/112* (2017.08); *B29C 64/153* (2017.08); *B29C 64/393* (2017.08); *B33Y 30/00* (2014.12); *B33Y 40/00* (2014.12); *B33Y 50/02* (2014.12)

(58) Field of Classification Search
CPC ......... B33Y 50/02; B33Y 30/00; B33Y 40/00; B33Y 10/00; B29C 64/35; B29C 64/393; B29C 64/112; B29C 64/153; B29C 64/364; B29C 64/371; B29C 64/20; B29C 64/357; B29C 64/25; B29C 31/02; B29C 64/307; B29C 64/255; B29C 64/379; Y02P 10/25; B22F 3/1055; B22F 2003/1059; B22F 2003/1056; B22F 2003/1057

See application file for complete search history.

(56) References Cited

U.S. PATENT DOCUMENTS

| | | | |
|---|---|---|---|
| 2001/0045678 A1* | 11/2001 | Kubo | ...................... B29C 64/35 264/37.29 |
| 2003/0067098 A1* | 4/2003 | Newell | .................. B33Y 40/00 264/442 |
| 2016/0236422 A1* | 8/2016 | Sakura | ...................... B08B 5/02 |

(Continued)

OTHER PUBLICATIONS

A Blog of Pneuvay Engineering ("Centrifugal blowers vs. Regenerative blowers—the Big Difference", available at http://www.pneuvay.com.au/pneumatic-conveying/news/Centrifugal-blowers-vs-regenerative-blowers---The-BIG-difference/, published on Jan. 28, 2016). (Year: 2016).*

*Primary Examiner* — Leith S Shafi
*Assistant Examiner* — Inja Song

(57) ABSTRACT

A three-dimensional printing system is for manufacturing and post-processing a three-dimensional article. The system includes a housing, a blower, and a residue trap. The housing is for surrounding the three-dimensional article during the post process and includes an air inlet and an air outlet. The blower includes an inlet and an outlet. The outlet supplies pressurized air to the air emitting nozzle. The residue trap is coupled between the housing air outlet and the inlet of the blower. The air circulates around a loop from the blower outlet, to the air inlet of the housing, out of the air outlet of the housing, and to the inlet of the blower.

17 Claims, 13 Drawing Sheets

(51) Int. Cl.
   *B33Y 40/00*   (2020.01)
   *B29C 64/153*  (2017.01)

(56) References Cited

U.S. PATENT DOCUMENTS

| | | | |
|---|---|---|---|
| 2016/0297625 A1* | 10/2016 | Zinski | B29C 48/92 |
| 2017/0259507 A1* | 9/2017 | Hocker | B29C 64/35 |
| 2018/0244034 A1* | 8/2018 | Sutcliffe | B29C 67/00 |
| 2018/0281237 A1* | 10/2018 | Frechman | B04C 9/00 |
| 2019/0143598 A1* | 5/2019 | Hakkaku | B29C 64/35 |
| | | | 425/165 |
| 2019/0291184 A1* | 9/2019 | Buller | B22F 3/1055 |
| 2020/0189174 A1* | 6/2020 | Bischoff | B29C 53/083 |

\* cited by examiner

THREE-DIMENSIONAL PRINTING SYSTEM WITH RECIRCULATING AIR HANDLING SYSTEM

CROSS-REFERENCE TO RELATED APPLICATIONS

This non-provisional patent application claims priority to U.S. Provisional Application Ser. No. 62/680,370, Entitled "Three-Dimensional Printing System with Recirculating Air Handling System" by Eric Innes, filed on Jun. 4, 2018, incorporated herein by reference under the benefit of U.S.C. 119(e).

FIELD OF THE INVENTION

The present disclosure concerns a three-dimensional printing system for the digital fabrication of three-dimensional articles. In particular, the present disclosure concerns an air handling system for applying heated air to remove uncured residue from three-dimensional articles and a capture system for removing residue aerosol from the air.

BACKGROUND

Three-dimensional printers are in wide use. Usually three-dimensional printers are utilized for low volume applications such as prototyping. There is an increasing desire to utilize three-dimensional printers for manufacturing. This can be challenging due to the batch-processing nature of three-dimensional printing along with associated post-processes. There is a desire to improve the efficiency of the overall system including the post processes.

SUMMARY

Figure 1:
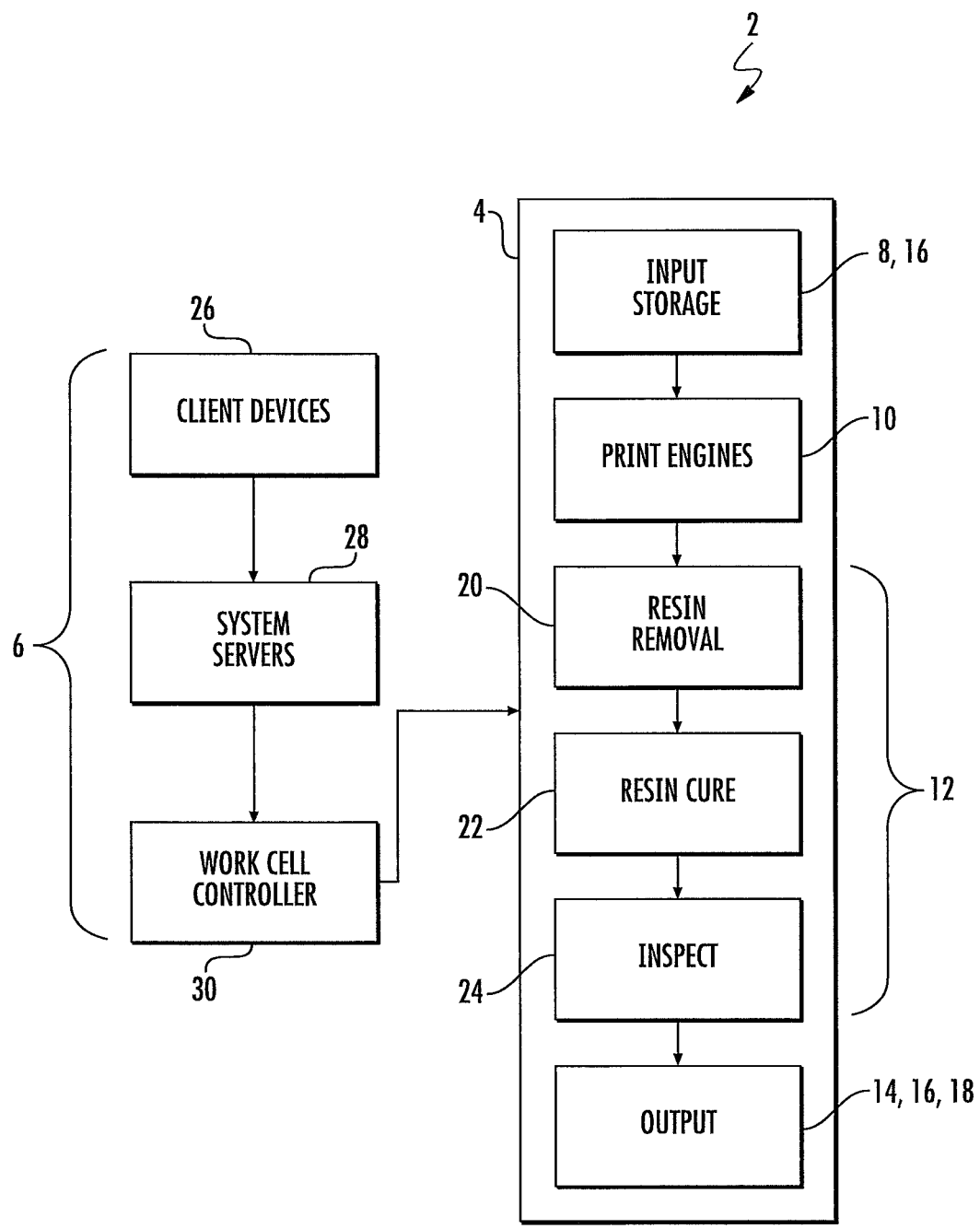
FIG. 1 is a schematic block diagram depicting an embodiment of a three-dimensional printing system.

In a first aspect of the disclosure, a system for post-processing a three dimensional article includes a housing with an air inlet and an air outlet, a blower, and a residue trap. The housing is for surrounding the three-dimensional article during a post-fabrication process. The blower includes an inlet and an outlet. The blower outlet supplies pressurized air to the air inlet of the housing. The residue trap is coupled between the housing air outlet and the inlet of the blower. The air circulates around a loop from the blower outlet, to the air inlet of the housing, out of the housing outlet, and to the inlet of the blower. The air inlet of the housing can be coupled to an air emitting nozzle within the housing.

In one implementation the blower is a regenerative blower including an impeller that rotates about a rotational axis. The inlet and outlet of the blower both impart an air flow direction that is generally parallel to the rotational axis. By "generally parallel" it is to be understood that mechanical tolerances and flow regimes (turbulent and/or laminar) induce flow vectors that are not perfectly parallel to the rotational axis but that the general directions are parallel. The inlet and outlet individually define a conduit axis that is substantially parallel to the rotational axis and to each other. This substantially parallel means designed to be parallel to within tolerance variations. By this reasoning the air flow is generally parallel to the conduit axis. The system can also include a variable frequency motor drive that provides power to the regenerative blower. The system can also include a temperature sensor that monitors a temperature of air being delivered to the air inlet of the housing and sends a signal to the variable frequency motor drive. The variable frequency motor drive modulates an angular velocity of the impeller in response to the signal in order to maintain a temperature of the air being emitted.

In another implementation the system includes an electronically controllable valve that couples the outlet of the blower to the air inlet of the housing. The system can also include a pressure sensor coupled to a controller. The pressure sensor generates indicative of a pressure of air being delivered to the air inlet of the housing. The controller receives the signal and modulates the valve in response in order to control the air flow velocity of the air passing into the inlet of the housing. The electronically controllable valve can be a throttle valve.

In yet another implementation, the system includes a residue collection reservoir that receives residue from the residue trap. A peristaltic pump can couple the residue trap to the residue collection reservoir.

In a further implementation, the three-dimensional article is supported by a support tray. The system can also include a continuous transport mechanism configured to transport the residue tray through the housing during the residue removal.

In a second aspect of the disclosure, a three-dimensional printing system includes a print engine subsystem and a post-process module. The print engine subsystem is configured to receive empty support trays and to output full support trays individually supporting fabricated three-dimensional articles. The post-process module includes: (1) a housing with an air inlet; (2) a continuous transport system configured to receive the full support trays and to transport them through the housing; (4) a blower having an outlet supplying pressurized air to the air inlet of the housing.

DETAILED DESCRIPTION OF THE PREFERRED EMBODIMENTS

In the disclosure mutually orthogonal axes X, Y, and Z are used. Axes X and Y are lateral axes and can be horizontal axes. Axis Z is can be a vertical axis. Generally speaking a direction of +Z is upward and −Z is downward. However, the axis Z may not be exactly aligned with a gravitational reference.

FIG. 1 is a schematic block diagram depicting an embodiment of a three-dimensional printing system 2. Printing system 2 includes a work cell 4 under control of a controller 6. The work cell 4 includes an input storage or cassette 8 of support trays 16, a print engine subsystem 10, a post-process subsystem 12, and an output storage or cassette 14.

Figure 5:
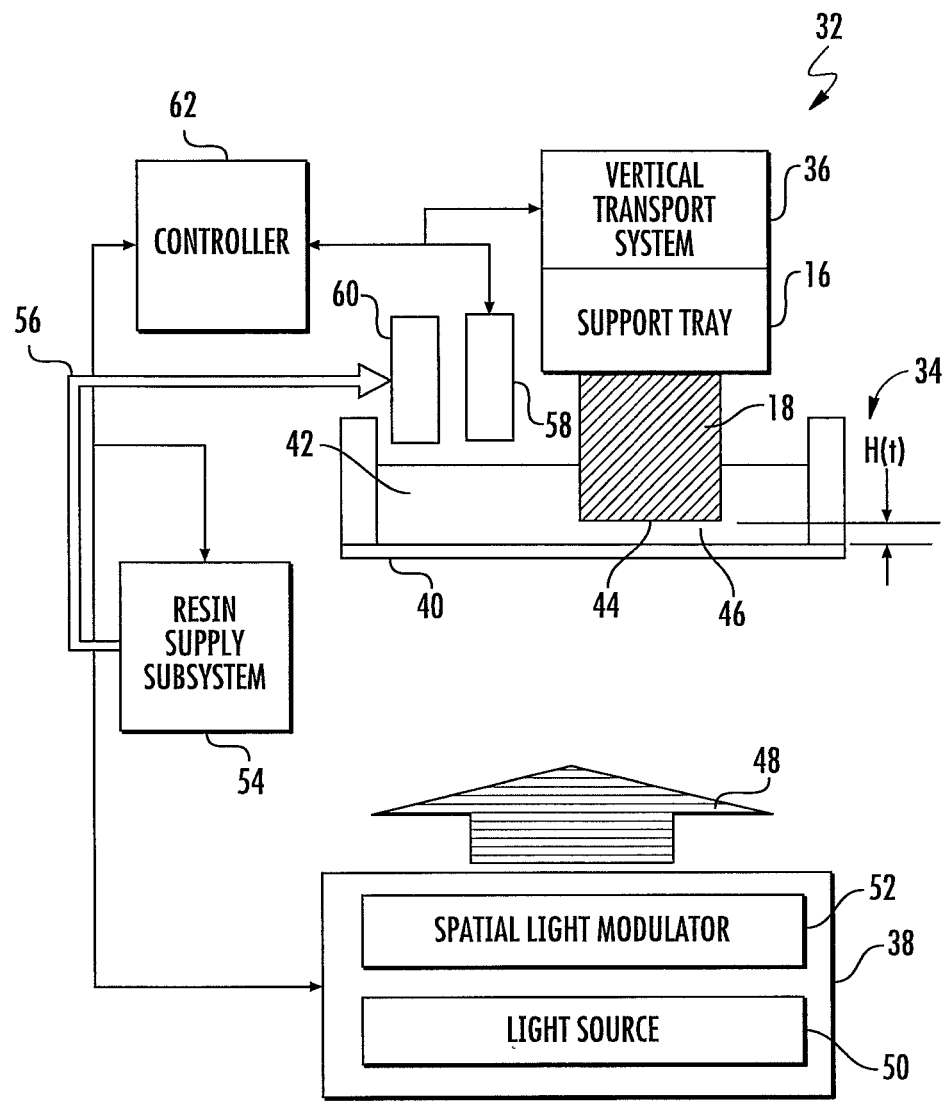
FIG. 5 is a block diagram schematic of an embodiment of a single print engine.
Figure 6A:
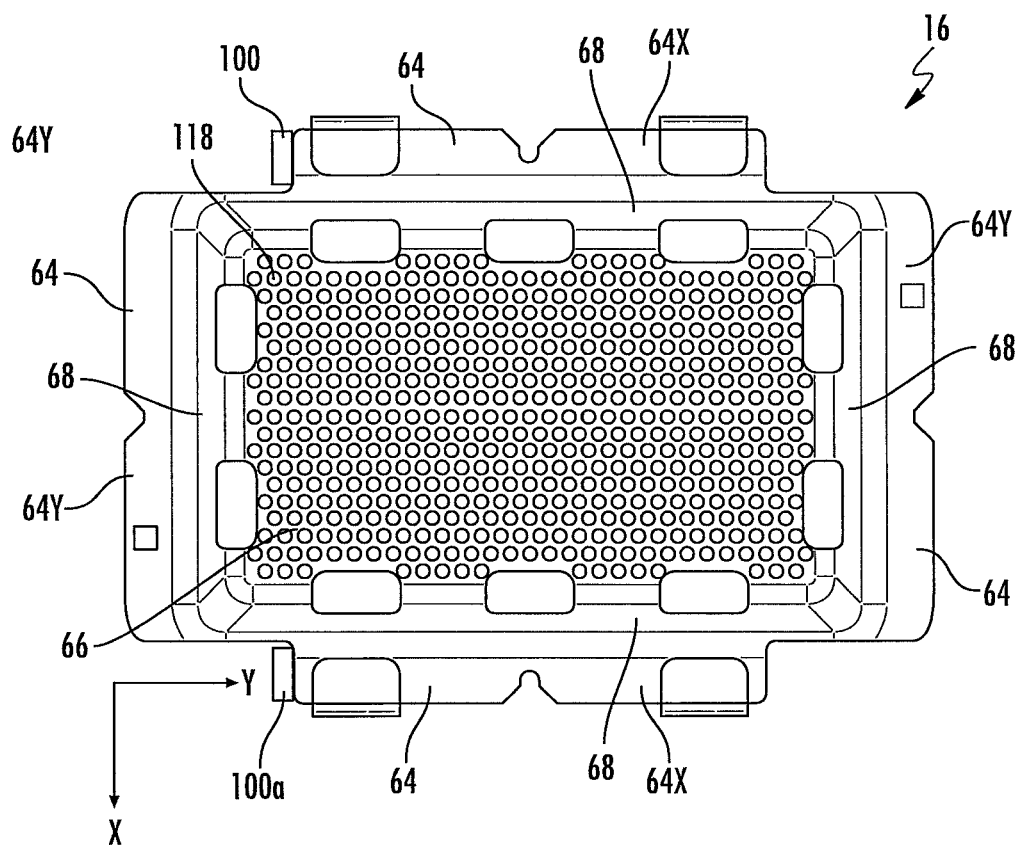
FIG. 6A is a top view of an embodiment of a support tray.
Figure 6B:
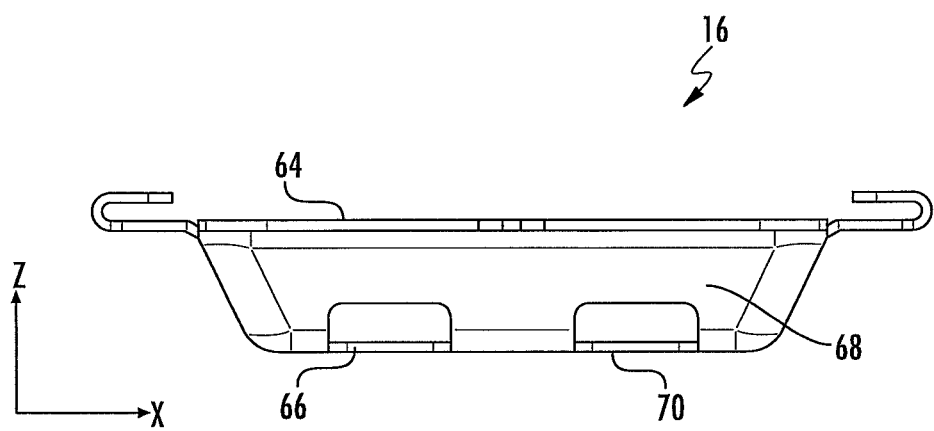
FIG. 6B is a side view of an embodiment of a support tray.

The input storage 8 stores empty support trays 16 (FIGS. 6A and 6B). An empty support tray 16 does not yet contain or support a three-dimensional article 18. The output storage 14 stores full support trays 16 that support three-dimensional articles 18 (see also FIG. 5). Individual support trays 16 pass sequentially from the input storage 8, through the print engine subsystem 10, through the post-process subsystem 12, and to the output storage 14.

The print engine subsystem 10 receives empty support trays 16 and then forms three-dimensional articles 18 upon the support trays 16. At the stage of leaving print engine subsystem 10, a three-dimensional article 18 is coated with uncured resin. The three-dimensional article 18 then passes through the post-process subsystem 12 including a resin removal module 20, a resin cure module 22, and an inspection module 24 before being stored in the output storage 14.

The controller 6 includes a processor coupled to an information storage device. The information storage device includes a non-volatile or non-transient storage device storing software instructions. The processor executes the software instructions to operate portions of the work cell and to perform other functions.

In the illustrated embodiment, the controller 6 includes one or more client devices 26, system servers 28, and a work cell controller 30. A client device 26 can be a desktop computer, a laptop computer, a tablet computer, a smartphone, or another device into which a user inputs information that specifies the manufacturing of three-dimensional articles 18. The system servers 28 route and process information from the client devices 26 and pass instructions to the work cell controller 30. The work cell controller 30 controls the subsystems within the work cell 4. Each of the subsystems within work cell 4 can individually include their own internal controllers. For example, the print engines of print engine subsystem 10 can individually have internal controllers.

Figure 2:
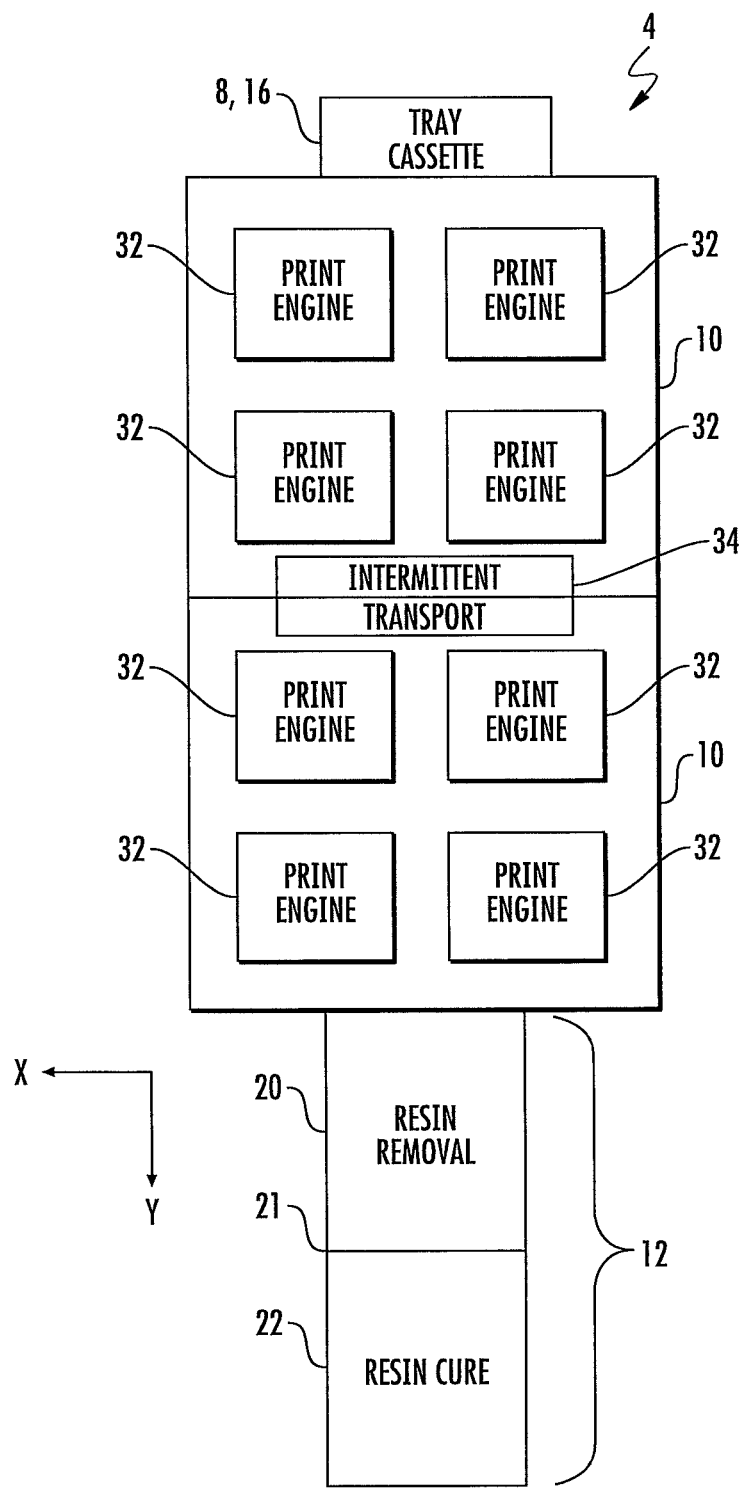
FIG. 2 is a schematic plan view of an embodiment of a portion of a work cell.

FIG. 2 is a schematic plan view of an embodiment of a portion of a work cell 4. Relative to FIG. 1, like elements numbers indicate similar elements. In the illustrated embodiment, the print engine 10 subsystem includes eight print engines 32. The post-process subsystem 12 includes the resin removal module 20 and the resin cure module 22. More details of the print engines 32 and the post-process subsystem 12 will be discussed infra.

An intermittent transport mechanism 34 is configured to move support trays 16 to and from the print engines 32. The intermittent transport mechanism 34 moves intermittently (not continuously) to pick and place the support trays 16 from one position to another. The intermittent transport mechanism 34 picks empty support trays 16 from the input storage 8 and places them into the print engines 32. The intermittent transport mechanism 34 also picks full support trays 16 from the print engines 32 and transfers them to the post-process module 12. The intermittent transport mechanism 34 moves laterally along the X and Y axes. The motion of the intermittent transport mechanism 34 can have positive or negative X and Y components. In some embodiments, the intermittent transport mechanism 34 can also move vertically along the Z axis with positive and negative vertical components. The intermittent transport mechanism 34 can also move along oblique motion vectors relative to the lateral axes X and Y or all three axes X, Y, and Z.

The illustrated post-process subsystem 12 includes a sequential arrangement of post-process modules including the resin removal module 20 and the resin cure module 22. When a tray 16 enters the resin removal module 20, it passes continuously in the +Y direction through this sequential arrangement. In the illustrated embodiment, the continuous motion through post-process subsystem 12 is of constant velocity (constant speed and unidirectional).

In some alternative embodiments, the motion of tray 16 through the sequence of post-processing modules may vary in speed to optimize the post-processes. In one alternative embodiment, the post-process subsystem may include a buffering magazine near a junction 21 between modules 20 and 22 to store a buffer enabling different transport speeds through the two modules. In another alternative embodiment, transport motion through the resin removal module 20 may halt to allow extra time for resin to be removed from the tray 16.

Figure 3:
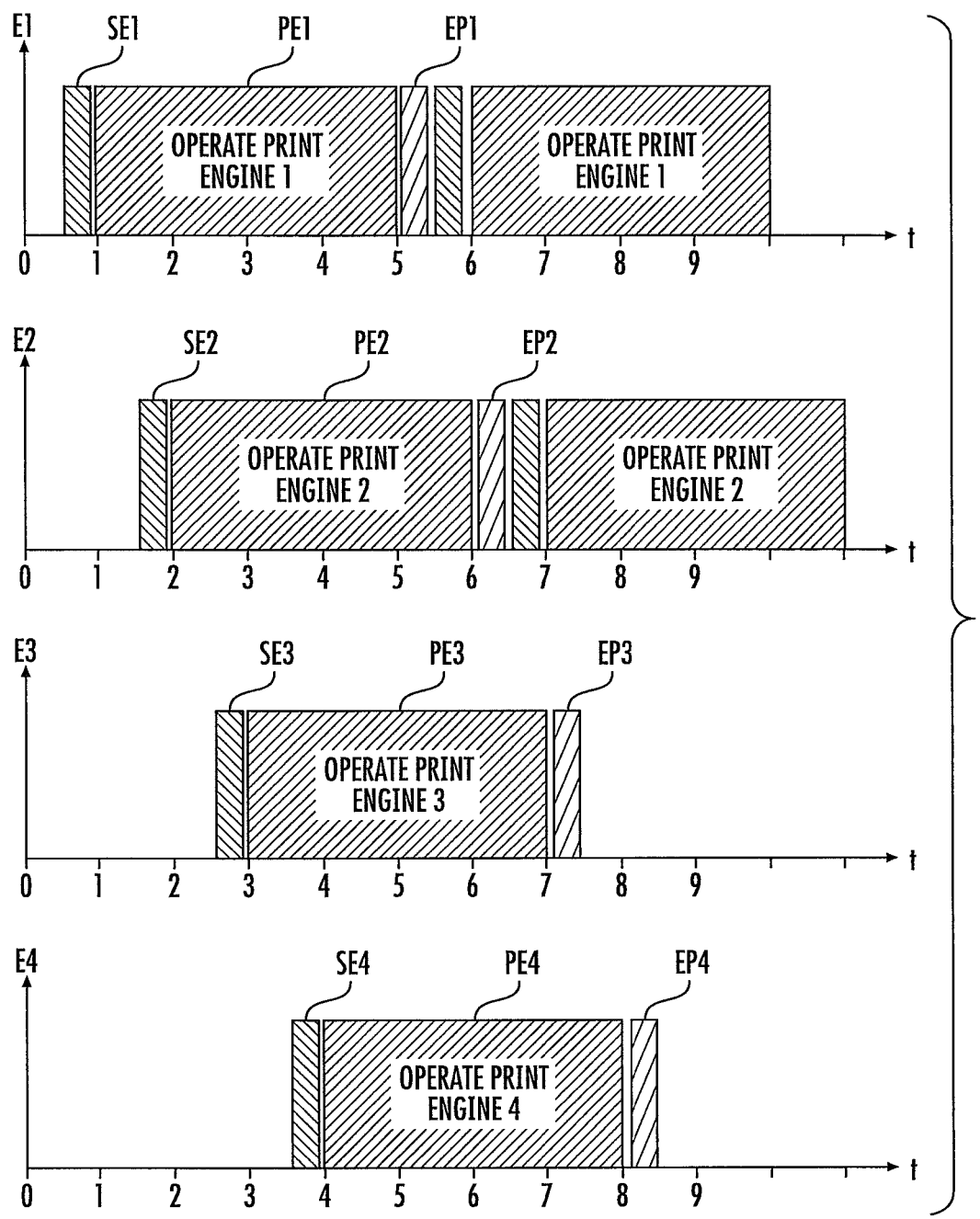
FIG. 3 is an embodiment of a timing diagram for a three-dimensional printing system having four print engines.

FIG. 3 is an embodiment of a timing diagram for a three-dimensional printing system 2 having four print engines 32 and a post-process subsystem 12. The graph vertical axes are labeled E1, E2, E3, and E4 to indicate first, second, third, and fourth print engines 32 respectively. The horizontal axis is a time axis t which has undefined time units for illustrative purposes. In some embodiments, a time increase of +1 on the axis can be indicative of one or more minutes of time passing. The number of print engines 32 can vary. Four print engines 32 are described for illustrative simplicity.

A first process SE1 is indicative of the intermittent transport mechanism 34 picking an empty tray 16 from the support tray storage 8 and placing it in a first print engine E1. Then according to process PE1, the first print engine E1 operates for four units of time to fabricate a three-dimensional article 18 onto the support tray 16.

While process PE1 is proceeding, the intermittent transport mechanism 34 picks and places an empty support tray 16 from tray storage 8 and places it in the second print engine E2 according to process SE2. Then according to process PE2, the second print engine 32 operates to fabricate a three-dimensional article 18.

While processes PE1 and PE2 are proceeding, the intermittent transport mechanism 34 picks and places an empty support tray 16 from support tray storage 8 and places it in the third print engine according to SE3. Then according to process PE3, the third print engine 32 operates to fabricate a three-dimensional article 18.

While processes PE1, PE2, and PE3 are proceeding, the intermittent transport mechanism 34 picks and places an empty support tray 16 from support tray storage 8 and places it in the fourth print engine according to SE4. Then according to process PE4, the fourth print engine 32 operates to fabricate a three-dimensional article 18.

While processes PE2, PE3, and PE3 are proceeding, (1) the first print engine 32 completes the fabrication of a three-dimensional article 18 and (2) the intermittent transport mechanism 34 picks and places a resultant full tray 16 from the first print engine to the post-processing subsystem 12 according to process EP1. The post-processing subsystem 12 then begins to continuously advance the full tray 16 through post-processes. Also while processes PE2, PE3, and PE3 are proceeding, the intermittent transport mechanism 34 picks and places an empty support tray 16 from tray storage 8 and places it in the first print engine 32 which then begins fabricating a three-dimensional article 18.

The rest of FIG. 3 is clear from the above discussion. The machine architecture of the work cell 4 can be optimized to keep a parallel arrangement of print engines 32 operating nearly continuously with only brief interruptions for unloading and loading support trays 16. The post-processing unit 12 provides a continuous or nearly continuous process that can have a throughput that matches that of the print engine subsystem 10.

While FIG. 3 illustrates a timing diagram including operation of four print engines 32, it is to be understood that the printing system 2 can have any suitable number of print engines 32. More generally, the print engine subsystem 10 has N print engines 32. The controller 6 operates the intermittent transport mechanism 34 to sequentially and individually transfer empty support trays 16 to M print engines 32, where M is less than or equal to N. The controller 6 operates the M print engines 32 to form M three-dimensional articles 18 which results in M full support trays 16. The operation of at least one of the M print engines 32 overlaps with the loading of a plurality of the others of the M print engines 32. The controller 6 operates the intermittent transport mechanism 34 to sequentially and individually transfer the full support trays 16 to a continuous transport mechanism of the post-process subsystem 12. The operation of at least one of the M print engines 32 overlaps with a transfer of plural full support trays 16 to the continuous transport mechanism of the post-process subsystem 12.

Figure 4:
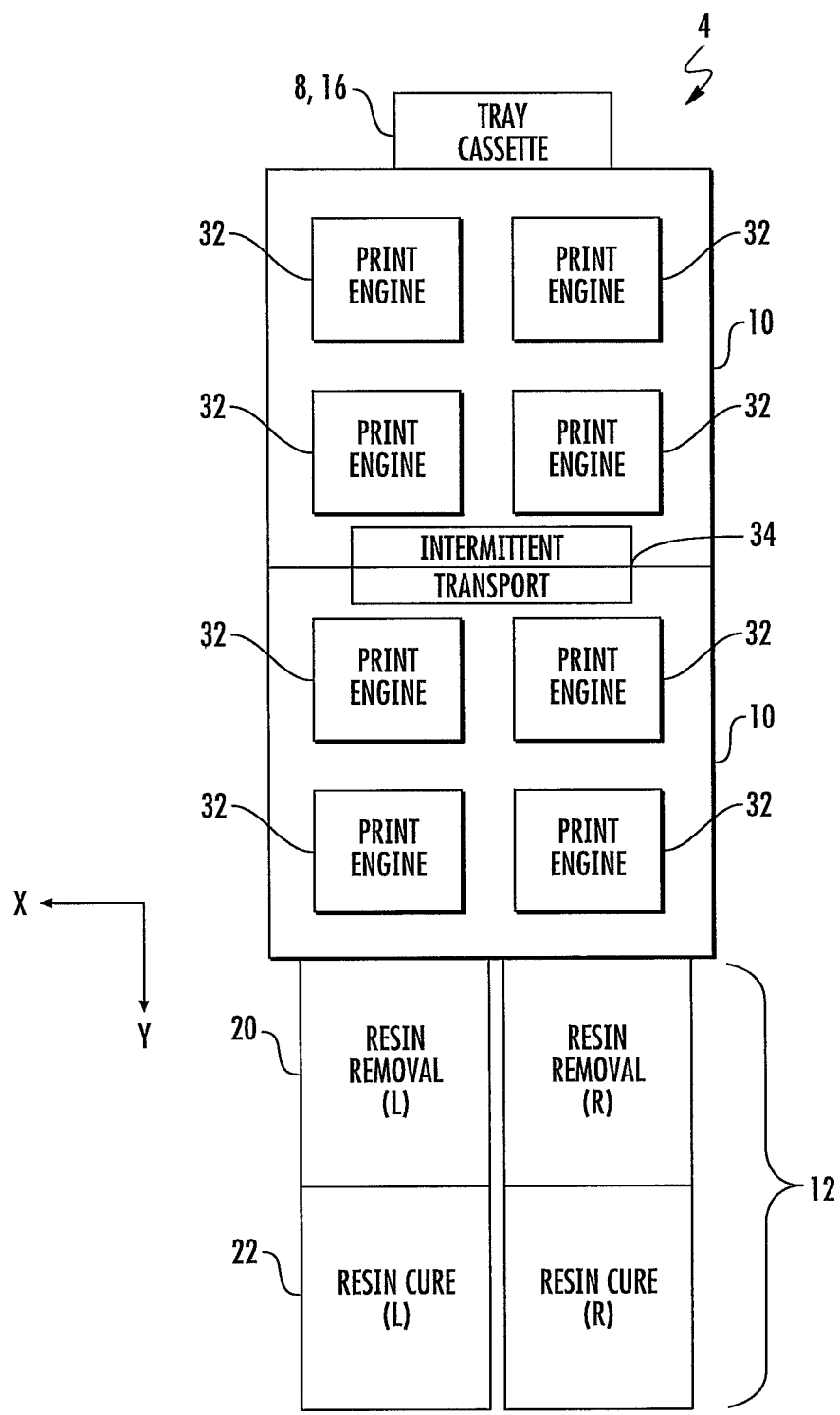
FIG. 4 is a schematic plan view of an alternative embodiment of a portion of a work cell having two parallel arrangements of post-process modules.

FIG. 4 is a schematic plan view of an alternative embodiment of a portion of a work cell 4. In comparing FIG. 4 with FIG. 2, the post-process subsystem 12 includes two parallel arrangements of post-process modules (left L and right R) that are arranged in a side-by-side configuration along the lateral X direction.

In one embodiment, the two parallel arrangements individually and continuously move resin trays 16 through the resin removal module 20 and the resin cure module 22. In some embodiments, translation speed of the resin tray 16 along the +Y direction is the same for left and right parallel arrangements. This would effectively double the throughput of the post-process module 12 compared to the embodiment of FIG. 2. Alternatively, the left and right arrangements can differ in terms of translation speed and process parameters which can apply to different geometries of three-dimensional articles 18.

In other embodiments of the work cell 4 the post-process module 12 can have three or more such parallel arrangements of post-process modules. In some embodiments, the parallel arrangements can be arranged along X or in Z with one parallel arrangement above another.

FIG. 5 is a block diagram schematic of an embodiment of a single print engine 32. The print engine 32 includes a resin vessel 34, a motorized vertical transport system 36 supporting a support tray 16, and a light engine 38. The resin vessel 34 includes a transparent sheet 40 on a lower side and contains a photocurable resin 42. The support tray 16 supports a three-dimensional article 18 having a lower face 44 in facing relation with the transparent sheet 40. Between the transparent sheet 40 and lower face 44 is a thin layer of the resin 42 defining a build plane 46 that is proximate to the lower face 44.

The vertical transport system 36 is configured to vertically position the support tray 16. The vertical transport system 36 is thereby configured to control an optimal distance H(t) between the transparent sheet 40 and the lower face 44 during the manufacture of the three-dimensional article 18.

The light engine 38 generates and projects pixelated light 48 up through the transparent sheet 40 and to the build plane 46. The application of the pixelated light 48 selectively hardens a layer of the resin 42 at the build plane 46 and onto the lower face 44. In the illustrated embodiment, the light engine 38 includes a light source 50 and a spatial light modulator 52.

A resin supply subsystem 54 includes a conduit assembly 56 and a resin level sensor 58. The conduit assembly 56 includes a fluid outlet 60 positioned above the resin vessel 34. Resin 42 is transported through conduit assembly 56 and then dispensed into resin vessel 34.

A controller 62 is electrically or wirelessly coupled to the work cell controller 30. Controller 62 is configured to receive signals from sensors such as resin level sensor 58 and to control vertical transport system 36, light engine 38, resin supply subsystem 54, and other portions of the print engine 32. The controller 62 can have one location or multiple locations within the print engine 32. The controller 62 includes a processor coupled to an information storage device. The information storage device includes a non-transient or a non-volatile media storing software instructions. The software instructions are executed by the processor to read signals from sensors and to operate portions of the print engine 32.

While a particular embodiment of the print engine 32 is depicted in FIG. 5, variations are possible. In one alternative embodiment, the print engine 32 is a stereolithography print engine with lasers that cure top layers of a three-dimensional article as it is being lowered into a tank of resin. In yet another embodiment the print engine 32 is a piezo inkjet print engine that forms a three-dimensional article using build material and support material. The post-processing subsystem 12 can then include a module for removing the support material. In yet other embodiments, the print engine 32 utilizes powders and the post-processing subsystem 12 includes a module for removing excess powder.

FIGS. 6A and 6B depict a support tray 16. FIG. 6A is a top view and FIG. 6B is a side view. Support tray 6A includes upper rim 64, a lower planar portion 66, and side walls 68 coupling the upper rim 64 to the lower planar portion 66. The lower planar portion 66 has a lower face 70 that faces downwardly. In the illustrated embodiment, the upper rim 64 includes four portions of the upper rim 64 that extend in four directions including plus and minus X and Y. In another embodiment, the upper rim can be one continuous rim that surrounds the side walls 68. In the illustrated embodiment discussed infra, the post-process subsystem 12 supports the support tray 16 by supporting the two illustrated rim portions 64X that extend in the lateral −X and +X directions (opposing directions along the lateral X-Axis). The upper rim 64 also includes two portions 64Y extending in the lateral −Y and +Y directions (opposing directions along the lateral Y axis).

Figure 7A:
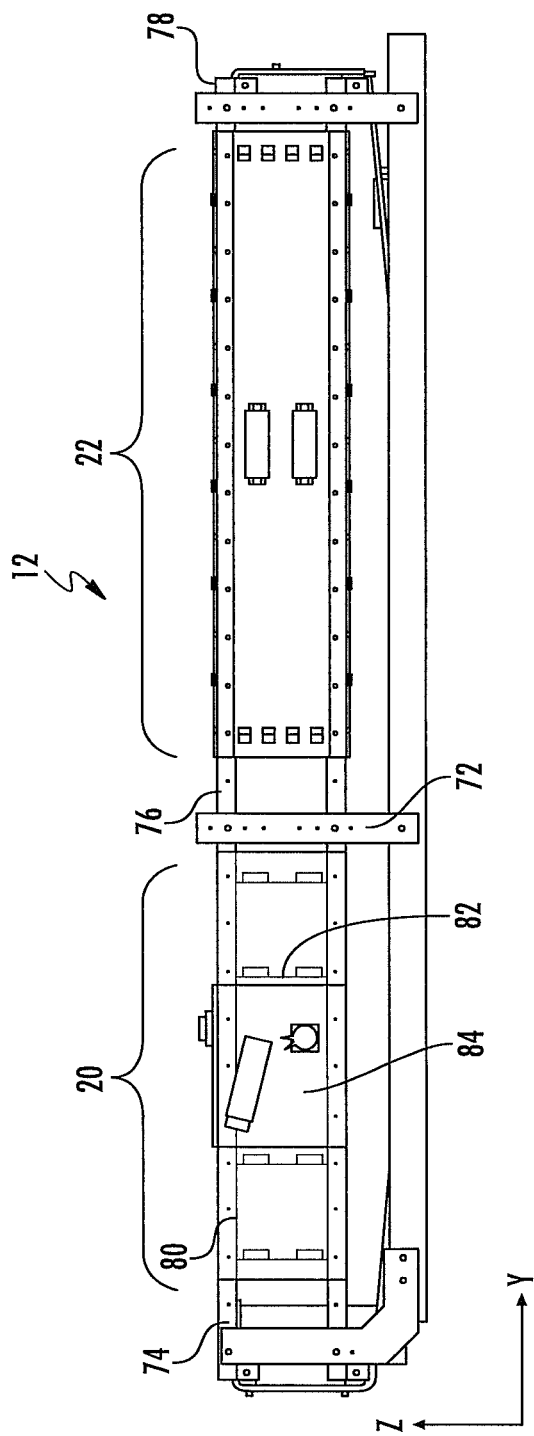
FIG. 7A is a side view of an embodiment of a post-process subsystem.

FIG. 7A is a side view of an embodiment of a post-process subsystem 12 with a sequential arrangement of post-processing modules including a resin removal module 20 and a UV cure module 22 that are arranged along the lateral Y axis. The post-processing modules are supported by a frame 72. The post-process subsystem 12 includes a leading end 74 before the resin removal module 20, a separation 76 between modules 20 and 22, and a trailing end 78 after the resin cure module 22. In passing through the post-processing subsystem a full support tray 16 is loaded onto the leading end 74 and is then transported through the resin removal module 20 followed by the UV cure module 22 before being moved from the trailing end 78 to an output storage 14.

Figure 7B:
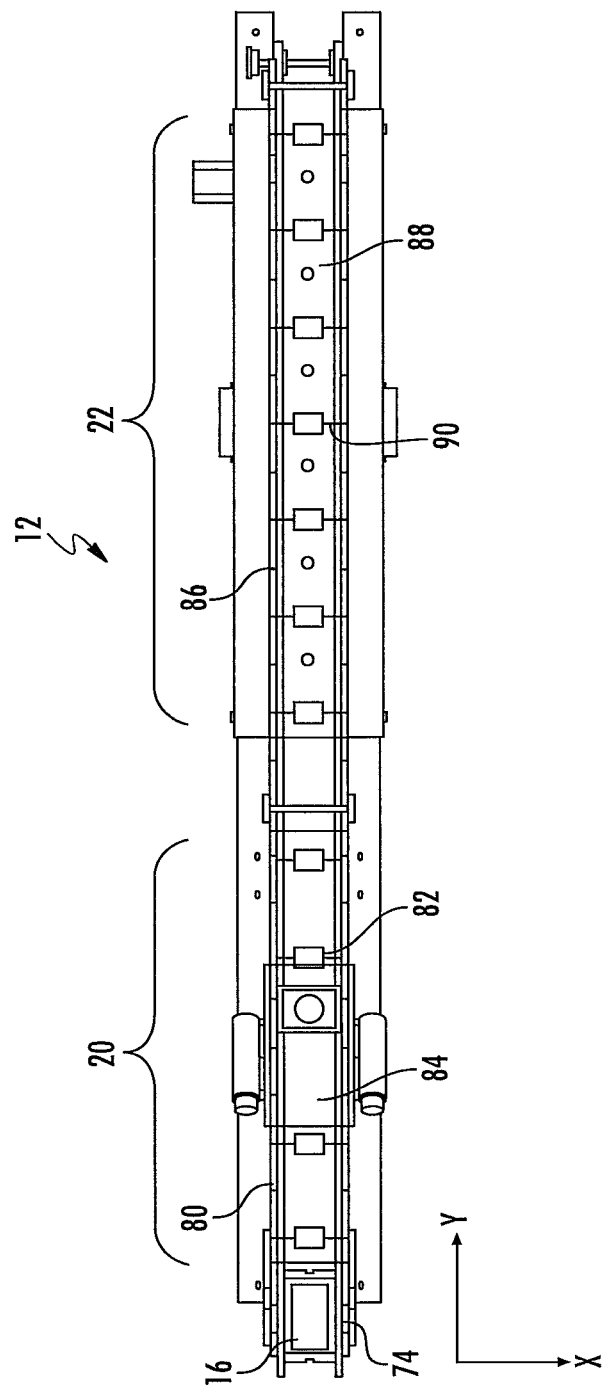
FIG. 7B is a top view of an embodiment of a post-process subsystem.

FIG. 7B is a top view of an embodiment of a post-process subsystem 12. A tray 16 is shown positioned at the leading end 74 of the post-processing system 12 just before it is transported in Y through the modules 20 and 22. As shown, the resin removal module 20 is enclosed in a housing 80. In the illustrated embodiment, the housing 80 is divided up by two partitions 82 into three chambers 84 that are arranged along the Y-axis. The resin cure module 22 is enclosed in a housing 86. In the illustrated embodiment, the housing 86 is divided into six chambers 88 by five internal partitions 90.

Figure 8:
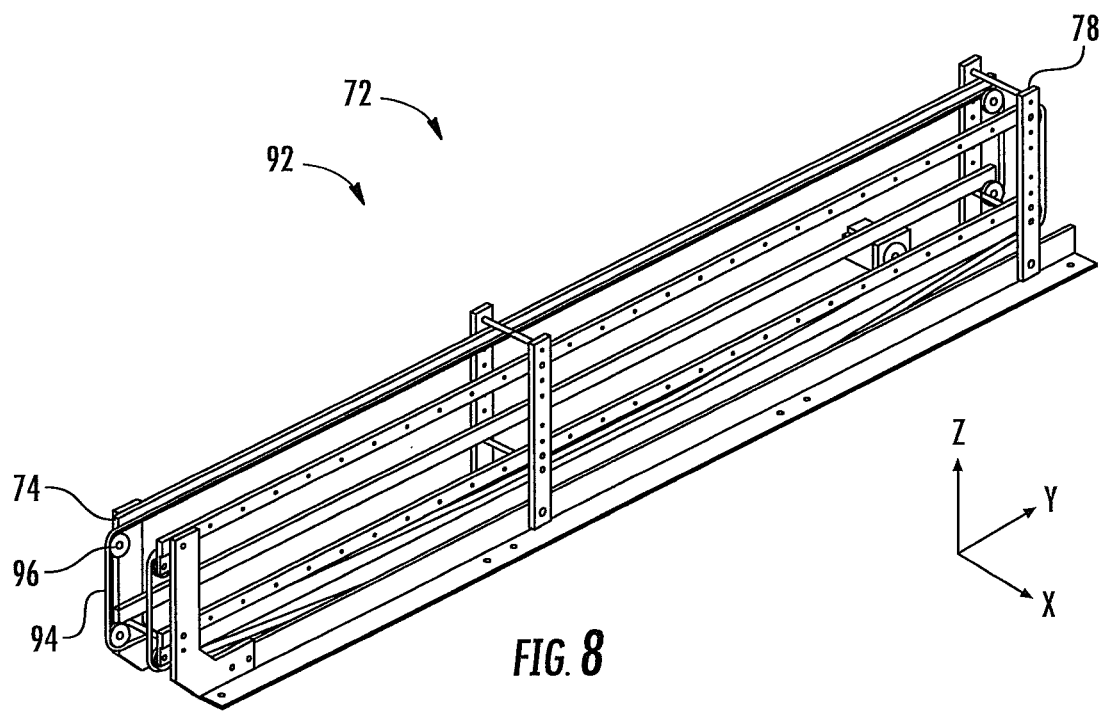
FIG. 8 is an isometric view of an embodiment of a support frame with a continuous transport mechanism.

FIG. 8 is an isometric view of an embodiment of a continuous transport system 92 including the support frame 72 but with the post-process modules 20 and 22 removed. The continuous transport system 92 is configured to transport a support tray 16 along the lateral axis Y from the leading end 74 to the trailing end 78 of the frame 72. During this transport a three-dimensional article 18 is transported through the modules 20 and 22 according to the illustrated embodiment of FIGS. 7A and 7B.

In another embodiment, the modules 20 and 22 individually have separate transport systems 92. This allows for different transport speeds through the modules 20 and 22. For example, in the resin removal module 20, it may be desirable for the support tray 16 to stop or slow down within the module to allow more time for resin removal from the three-dimensional article 18. On the other hand, a support tray 16 may move through the module 22 with a different speed versus time profile. Having two independent transport systems 92 therefore decouples the speed profiles of the two modules 20 and 22.

Figure 9:
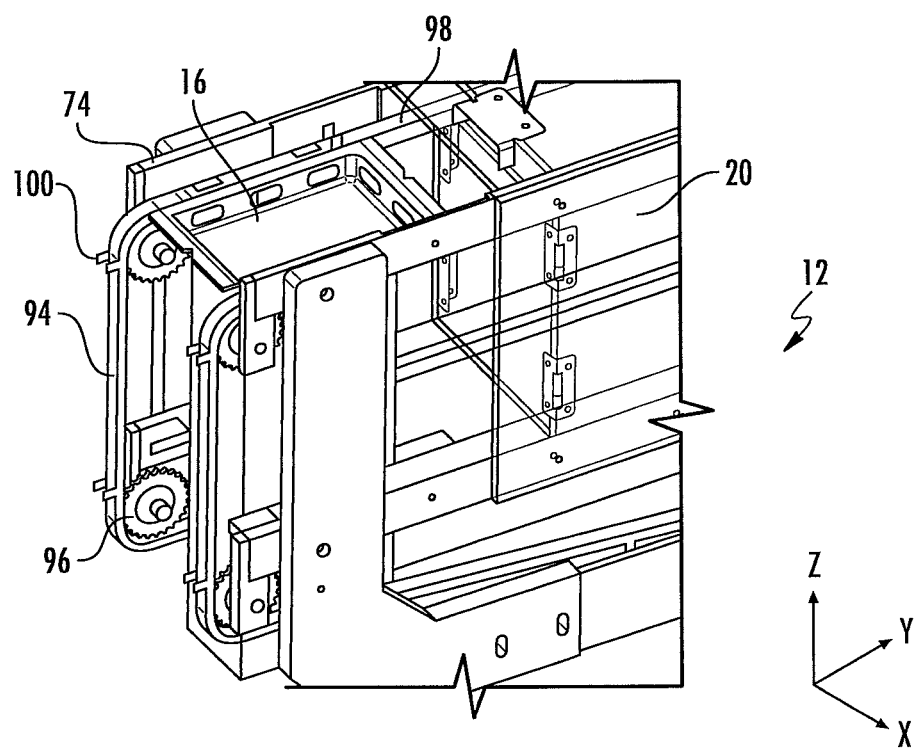
FIG. 9 is an isometric view of an embodiment of a leading end of a post-processing module.

FIG. 9 is an isometric view showing the leading end 74 of the post-processing module 12 including a portion of the resin removal module 20. The continuous transport system 92 includes a synchronized pair of chains or belts 94 supported by sprocket wheels 96. The chains 94 translate along lateral axis Y and are spaced apart along lateral axis X. The chains 94 have outer surfaces 98 that support portions of the upper rim 64 of a support tray 16. The chains include synchronized pairs of tabs 100 that extend outwardly from the outer surface 98. The tabs 100 are spaced along the chains with a spacing that exceeds a lateral dimension of a support tray 16. In the illustrated embodiment, the rim portions 64X are received upon the upper (outer) surface 98. The tabs 100 engage trailing portions of the rim portions 64X as illustrated further in FIG. 6A as the engagement of tabs 100 and 100a with the rim 64.

Figure 10:
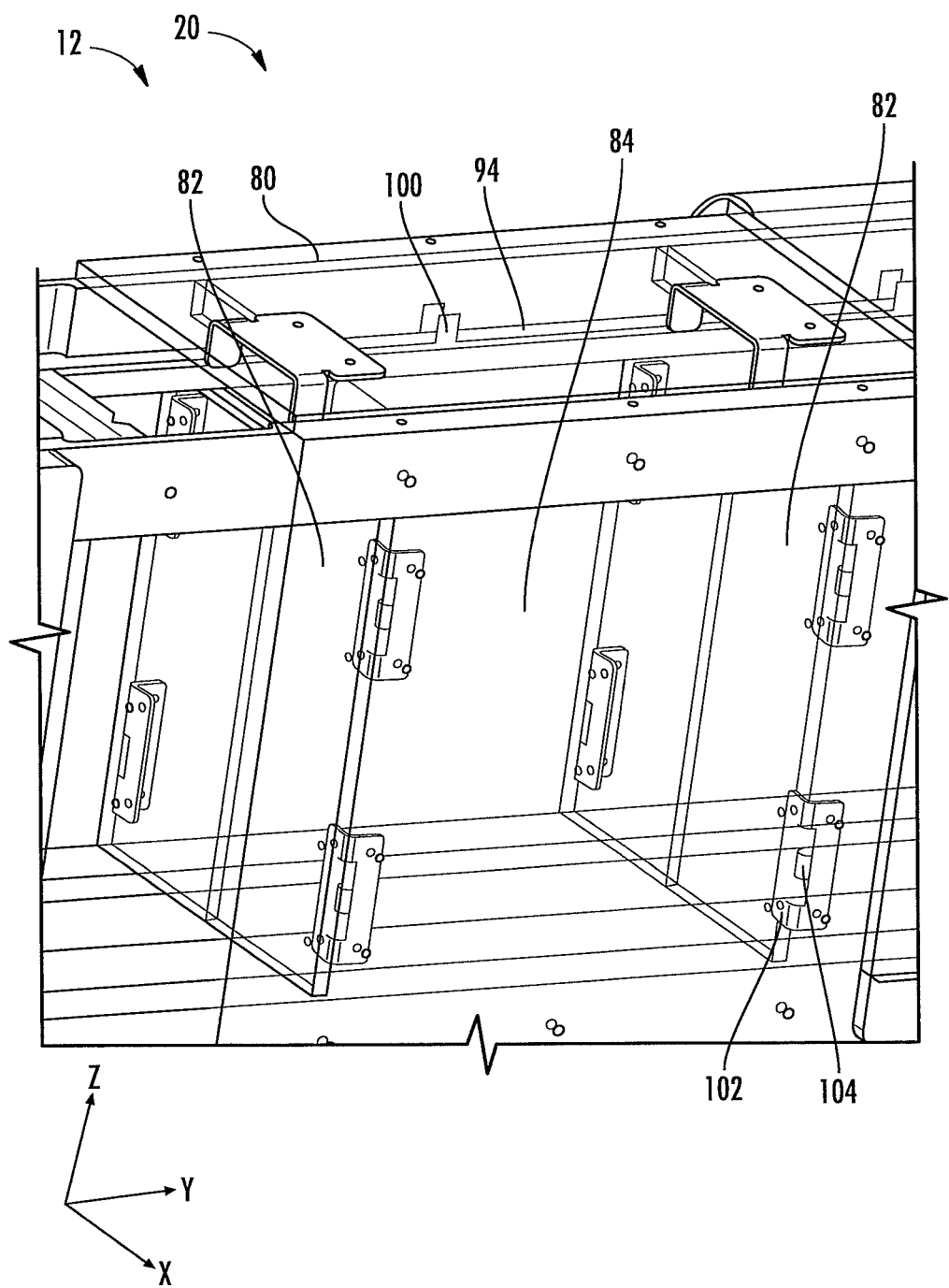
FIG. 10 is an isometric view of an embodiment of a leading end of a resin cure module.

FIG. 10 is an isometric view of a portion of the post-process subsystem 12 showing a portion of the resin cure module 20 with emphasis on a leading chamber 84. The chamber 84 is bounded along the axis Y by partitions 82. In the illustrated embodiment, the partitions 82 are spring-loaded doors 82. The doors 82 rotate about vertical axes defined by hinges 102. The doors 82 are normally biased shut by torsion springs 104. When a support tray 16 is loaded upon the moving chains 94 at leading end 74, a leading edge of the support tray 16 reaches an entrance door 82 leading in to the first chamber 84. The torsion spring 104 resistance of the door 82 halts motion of the support tray 16 until edges of the rim 64 is engaged by a pair of tabs 100. This has the effect of aligning the trailing edge of the support tray 16 with a leading edge of the tabs 100. The force of the tabs 100 then pushes the support tray 16 to push open the pair of entrance doors 82 so that the support tray 16 and its attached three-dimensional article 18 can enter the first chamber 84.

In an alternative embodiment, the partitions 82 can be motorized doors that automatically translate along the lateral direction X to allow passage and to isolate support trays 16. In another alternative embodiment, the partitions 82 can be flexible plastic sheets that extend into the housing 80. In one particular embodiment, partitions 82 can be doors 82 that move vertically downward. When a support tray is being transported into the chamber 84, the door 82 can move downwardly according to a downward projection of the three dimensional article 18 from the lower face 70 of the support tray 16. This minimizes the extent to which a door 82 must move to allow the three dimensional article 18 to clear an upper edge of the door 82.

Figure 11A:
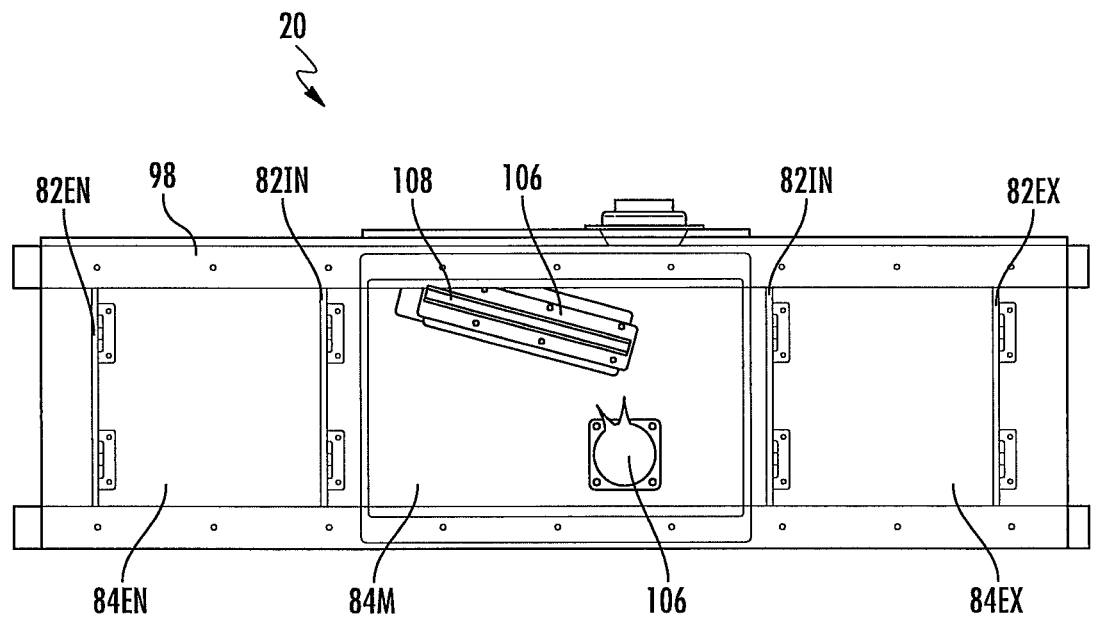
FIG. 11A is a side view of an embodiment of a resin removal module.
Figure 11B:
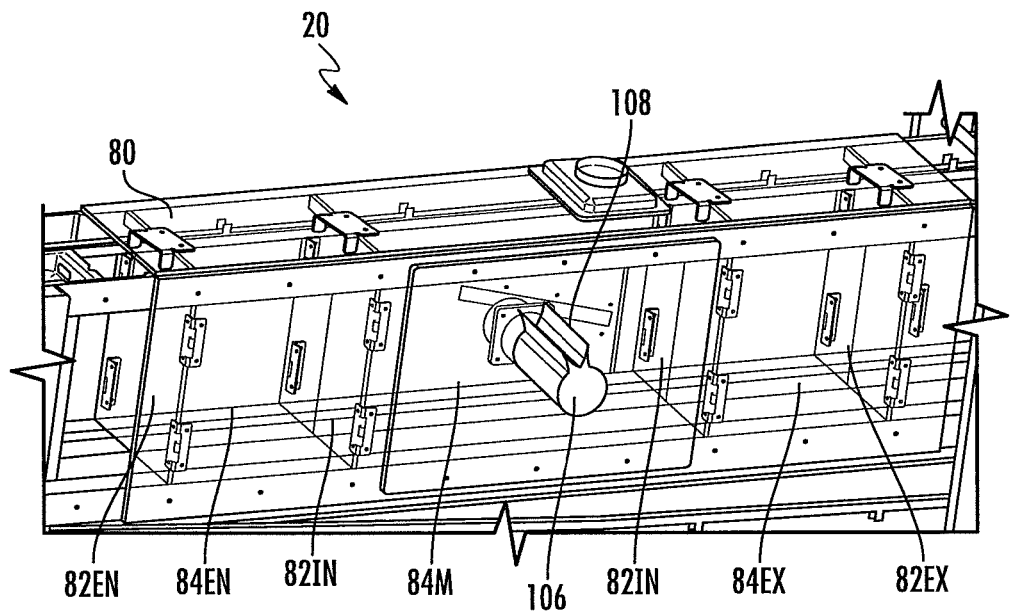
FIG. 11B is an isometric view of an embodiment of a resin removal module.

FIGS. 11A and 11B are side and isometric views of the resin removal module 20 respectively. The housing 80 is closed off by an entrance door 82EN and an exit door 82EX respectively. The interior doors 82IN divide the housing up into three chambers 84 including an entrance chamber 84EN, a middle chamber 84M, and an exit chamber 84EX. The full support tray 16 with the three-dimensional article 18 sequentially passes into the entrance door 82EN, through the interior doors 82IN, and out the exit door 82EX. The full support tray 16 sequentially passes through the entrance chamber 82EN, the middle chamber 84M, and out the exit chamber 82EX.

In one embodiment, the support trays 16 have a length along a long axis Y of 185 millimeter (mm). The tab 100 pitch is 300 mm along Y so that there is a 115 mm distance between trays when the chain 94 is fully loaded. The lateral Y dimension of the chambers is 200 mm for the entrance and exit chambers and 400 mm for the middle chamber. The dimensions and number of chambers 84 can vary.

Disposed within the middle chamber 84M is at least one fluid emitting nozzle 106. In one embodiment, the fluid is air and the chamber 84M contains a plurality of nozzles 106. In the illustrated embodiment, a nozzle 106 is a "hot air knife" that emits heated air from an elongated slot 108. Hot air knives 106 have the effect of lowering the viscosity of uncured resin and blowing it off the three-dimensional article 18. In some embodiments, the entrance chamber 84EN includes a heater such as a radiant heater to pre-heat the three-dimensional article 18 to facilitate the resin removal.

In the illustrated embodiment, nozzles 106 are confined to the middle chamber 84M. There is always at least one door 82 closed between a three-dimensional article 18 within middle chamber 84M and an atmosphere surrounding the housing 80. This assures that any resin aerosol generated during the cleaning process will be confined to the housing 80. As will be discussed infra, the housing 80 is coupled to an air handling system that captures and removes resin from resin-laden air.

In the illustrated embodiment, the nozzles 106 are described as emitting hot air. In other embodiments, some nozzles can also emit other fluids such as solvent for removing residual resin. Also, the nozzles can have any geometry such as elongated rectangular slots 108, round holes, or other shapes.

The illustrated embodiment depicts the resin removal module 20 as divided up into three chambers 84. In alternative embodiments, resin removal module 20 can be divided up into less or more chambers 84. In some embodiments, the resin removal module may include more than one middle chamber 84M within which the nozzles 106 are removing resin.

Figure 12:
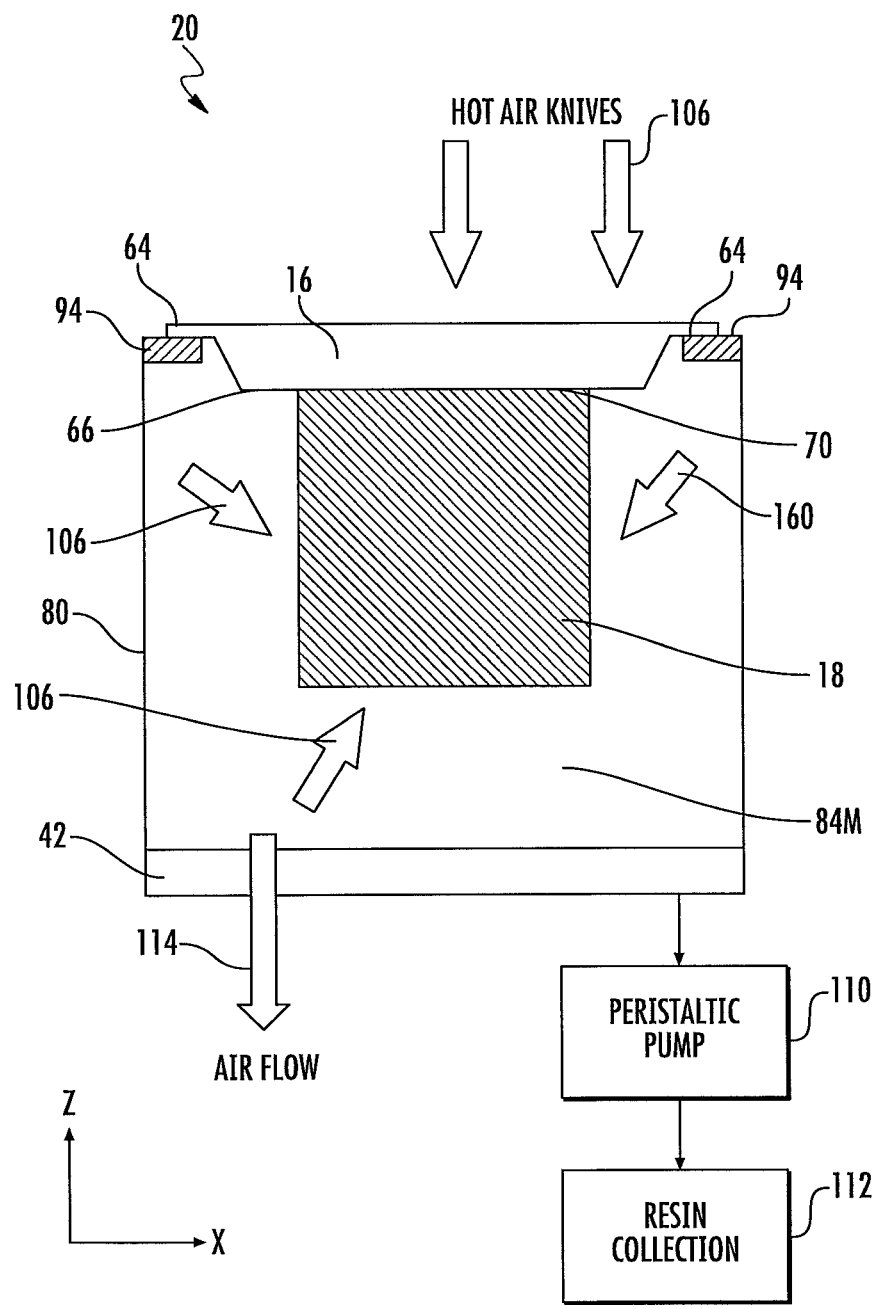
FIG. 12 is a simplified schematic diagram of a cross-section through an embodiment of a chamber of a resin removal module.

FIG. 12 is a simplified schematic diagram of a cross-section through the middle chamber 84M of the resin removal module 20 taken along the X axis. A full support tray 16 is supported by the moving chains 94. Opposing upper rims 64 of support tray 16 rest upon parallel chains 94. A three-dimensional article 18 is attached to the lower face 70 of the lower planar portion 66 of the support tray 16.

A plurality of nozzles 106 are disposed within the middle chamber 84M to treat various surfaces of the three-dimensional article 18. In the illustrated embodiment, most of the nozzles 106 employed emit gas with a generally downward trajectory so that an air handling system can remove aerosol laden air from a lower portion of the housing 80. The trajectories can be downwardly directed but have vector components along plus or minus X or Y. In some embodiments, there may be a nozzle 106 that has an upward trajectory for treating certain geometries of the three-dimensional article 18.

As the resin removal process occurs for three-dimensional articles 18, liquid resin 42 can accumulate at lower portions of the housing 80. A peristaltic pump 110 can be used to pump the accumulated resin into a resin collection reservoir 112.

Also illustrated is an air path 114. An air handling system can be used to establish a downward air flow that removes resin laden air from chamber 84M and also balances the input of nozzles 106 to control a pressure within the chamber 84M.

Figure 13:
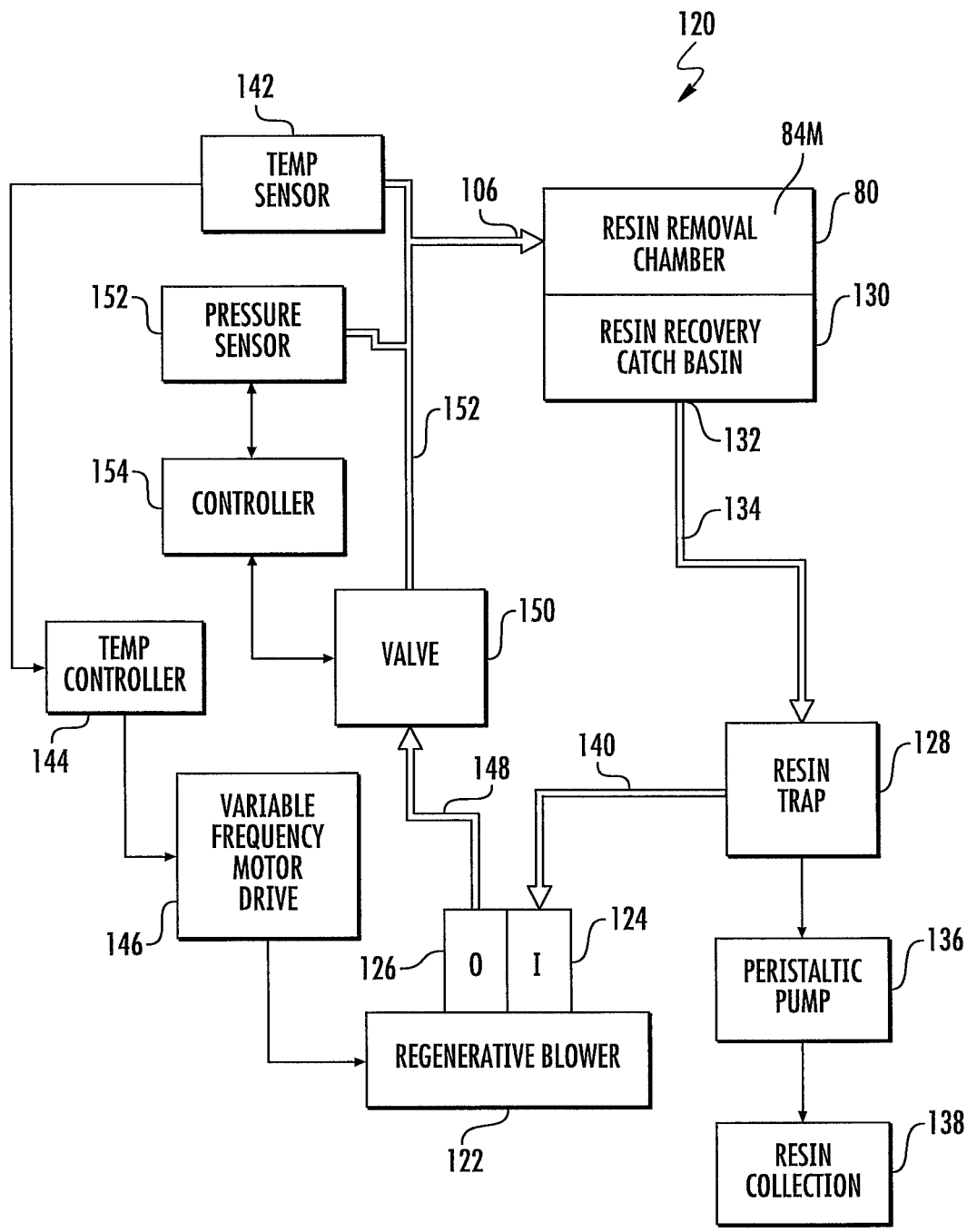
FIG. 13 is a block diagram schematic of an embodiment of an air handling system for a resin removal module.

FIG. 13 is a block diagram schematic of an air handling system 120 for the resin removal module 20. Air handling system 120 includes a blower 122 with an inlet 124 and outlet 126. In the illustrative embodiment, the blower 122 is a regenerative blower 122. The outlet 126 of the blower 122 provides air flow for nozzles 106. The inlet 124 of the blower 122 draws air from chamber 84M and through a resin trap 128. Thus, a circulating closed loop air flow path is provided whereby air flows from regenerative blower 122 outlet 126 to nozzles 106, out of nozzles 106 into chamber 84M, out of chamber 84M into resin trap 128, and from resin trap 128 back to the inlet 124 of resin blower 122.

The regenerative blower 122 has an impeller that imparts the motion to air through the air flow path. The impeller has a rotational axis. The inlet 124 and outlet 126 are generally parallel to the rotational axis of the impeller and generally direct air in directions that are generally parallel to the rotational axis. By "generally parallel" it is to be understood that tolerances and flow regimes (laminar versus turbulent) may induce flow vectors that are not perfectly parallel, but the general flow direction is parallel. (This is as opposed to a centrifugal blower in which the outlet is generally perpendicular to the rotational axis.) The inlet and outlet individually define a conduit axis that is substantially parallel to the rotational axis and to each other. This substantially parallel means designed to be parallel to within tolerance variations. By this reasoning the air flow is generally parallel to the conduit axis.

The housing 80 is divided into an upper portion resin removal chamber 84M where nozzles 106 are operating to remove residual resin from a three-dimensional article 18 and a resin recovery catch basin 130. Liquid resin 42 can accumulate in the catch basin 130 and be removed as illustrated earlier with respect to FIG. 12. The resin removal chamber 84M has an exit port 132 at which air laden with resin aerosol exits chamber 84M and then travels along a conduit 134.

The resin laden air then enters a resin trap 128 which removes the aerosol. The incoming resin accumulates as a liquid resin in resin trap 128. A peristaltic pump 136 periodically pumps the accumulated resin out of the resin trap 128 and into a resin collection reservoir 138. In some embodiments, the resin collection reservoirs 112 (FIG. 12) and 138 are the same. In some embodiments, the resin from resin collection reservoir 112 and/or 138 is manually or automatically pumped into the resin supply subsystem 54 (FIG. 5). The resin trap 128 outputs clean air that passes through a conduit 140 to the inlet 124 of the blower 122.

In the illustrated embodiment, the regenerative blower 122 generates considerable heat and heats the air being passed to the nozzles 106. This is desirable, since the heated air is effective in reducing a viscosity of residual resin which makes the air removal more effective. Generally speaking, a higher power input into the regenerative blower 122 will generate more heat. The output temperature is regulated by a control system that includes a temperature sensor 142, a temperature controller 144, and a variable frequency motor drive 146. The temperature sensor 142 and temperature controller together output a signal that is indicative of an air temperature of air passing to the nozzle 106. In an illustrative embodiment, the temperature sensor 142 is a thermocouple. The signal from the temperature controller 144 controls the variable frequency motor drive 146 that in turn modulates the power level of the regenerative blower 122. In an illustrative embodiment the temperature of air passing to nozzles 106 is controlled to be a selected range between 40 degrees Celsius and 80 degrees Celsius. In some embodiments the air temperature is controlled to be between 40 and 60 degrees Celsius. In other embodiments, the air temperature is controlled to be between 60 and 75 degrees Celsius. Yet other embodiments are possible that depend partly upon a susceptibility of the three-dimensional article 18 to temperature induced warping.

With the regenerative blower 122 speed modulated to control the temperature of the air stream entering nozzles 106, there is a need to provide a separate control to provide a desired airflow through nozzles 106. Air leaving the outlet 126 of blower 122 passes through a conduit 148 to a valve 150 and then through a conduit 152 to the nozzles 106. The valve 150 modulates a flow rate of air the conduit 152 and to nozzles 106 to a desired level. This is accomplished by controlling an air pressure in conduit 152 to a desired level to be upstream of the nozzles 106. In the illustrative embodiment, the valve 150 is an electronic throttle valve.

A pressure sensor 154 is coupled to the conduit 152. The pressure sensor 152 outputs a signal that is indicative of the air pressure in conduit 152. The signal passes to a controller 154 that controls the valve 150 to provide the desired pressure.

Referring again to FIGS. 11A, 11B, and 12, the objective of the resin removal module 20 is to remove the residual resin as completely as possible. Any remaining resin would be cured and could affect the dimensional accuracy of the three-dimensional article 18. At the same time, there is a concern that the process of impinging heated air onto the three-dimensional article 18 may cause warpage or other deformation that might also affect dimensional accuracy. This is particularly true when the three-dimensional article 18 has long and thin portions that might be susceptible to such heat and/or force induced deformation. Different resin formulations may also have different susceptibilities to such deformation.

To accommodate different designs and resins, a number of resin removal parameters can be optimized. These can include a number of nozzles 106 employed, geometry of nozzles 106, orientation of nozzles 106, air flow rate through the nozzles 106, temperature of the emitted air, and a velocity along Y of the support tray 16 through the resin removal module 20. For very deformation susceptible materials and designs, it may be desirable to operate at a minimal temperature and flow rate through nozzles 106 and to have a much lower velocity of the support tray 16 along the Y-axis.

Referring back to FIG. 4, a design with more than one resin removal module 20 allows the resin removal modules 20 to individually be optimized for deformation susceptibilities. Alternatively, with only one resin removal module 20, the operational parameters including flow rate through nozzles 106, temperature of air through nozzles 106, and translation velocity of the chain 94 can be adjusted in real time for groups of three-dimensional articles 18 having varying deformation susceptibilities. For extreme cases, a post-process module 12 can be "turned off" so that resin removal and curing can be performed manually for highly susceptible three-dimensional articles 18.

Figure 14:
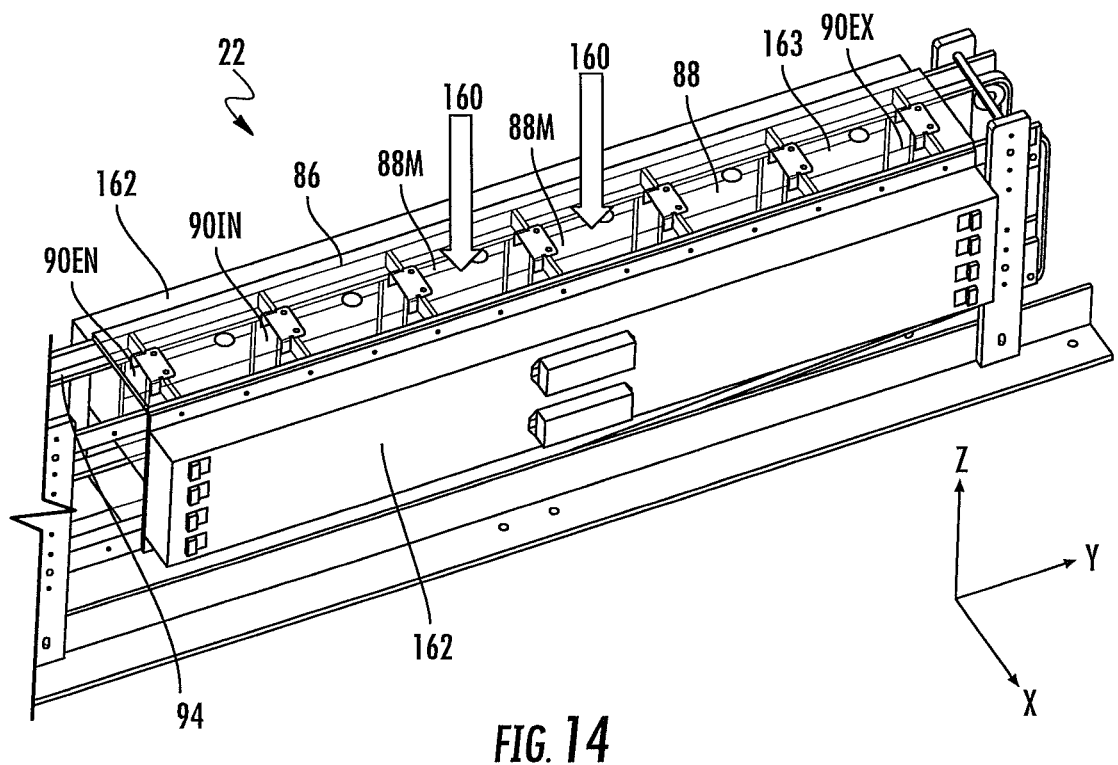
FIG. 14 is an isometric drawing of an embodiment of a resin cure module.

FIG. 14 is an isometric drawing of an embodiment of a resin cure module 22. In the illustrated embodiment, the housing 86 includes seven doors 90 including an entrance door 90EN, five internal doors 90IN, and an exit door 90EX. The doors 90 are similar in structure and function as the doors 82 in the resin removal module 20. The five internal doors 90IN divide the resin cure module into six chambers 88. The lateral dimension of individual chambers along Y is a little greater than the lateral dimension in Y of one support tray 16. This allows a support tray 16 to enter and exit a particular chamber with only one door 90 pushed open at a time. In a particular embodiment, the lateral dimensions in Y are 200 mm for each chamber and 185 mm for a support tray 16.

A gas supply 160 infuses an inert gas into at least some of the chambers 88 including at least the two most central inner chambers 88M. In one embodiment, the gas is nitrogen. In some embodiments, the gas supply 160 infuses inert gas into four or even all six chambers 88. The inert gas infusion reduces an oxygen percentage within the interior of the chambers 88. As the outer doors 90EN and 90EX are opened, an outside atmosphere introduces more oxygen into an outermost chamber 88. But with sufficient flow of inert gas from the gas supply 160 and with the interior doors 90IN, the oxygen level depletes from the outer chambers 88 to the inner chambers 88M. The molar percentage of oxygen is in this way reduced in the inner chambers 88M. This facilitates a rapid light curing of the three-dimensional article 18.

In an illustrative embodiment, the molar percentage of oxygen is reduced to less than five molar percent. In a more particular embodiment, the molar percentage of oxygen is reduced to less than four molar percent. In a yet more particular embodiment, the molar percentage of oxygen is reduced to less than two molar percent.

According to the illustrated embodiment, the doors 90 don't provide a complete seal between the chambers 88 when the doors are closed. Because of that, the inert gas pumped into the inner chambers 88M is constantly streaming out through gaps between the doors 90 and the outer housing 86. This movement of the inert gas purges out oxygen from the inner chambers 88M. In some embodiments, the doors 90 define gaps with each other and the housing 86 that are 4 millimeters or less in width.

In an alternative embodiment, the doors 90 may form a seal but include openings for movement of the inert gas. The openings or gaps have a fluid flow resistance that is in part based upon the flow rate of the inert gas from gas supply 160. In another an alternative embodiment, the chambers 88 are completed sealed except for the entrance 90EN and exit 90EX doors.

A pair of light sources 162 are arranged on opposing sides of housing 86. In the illustrated embodiment, the light source include tubular metal vapor discharge lamps. Each opposing light source 162 includes four tubular lamps that are arranged along the vertical axis Z. The lamps individually extend along the lateral axis Y. In a particular embodiment, the lamps are fluorescent lamps that are referred to as VHO (very high output) lamps. In one embodiment, the lamps output light having two broad spectrum peaks including an ultraviolet peak and a blue peak.

In one embodiment, the chambers 88 are heated to a temperature above 25 degrees Celsius. In some embodiments, the chamber temperature is maintained within a range of about 40 degrees Celsius to 80 degrees Celsius. Higher temperatures accelerate a cure rate but also can cause warpage of the three-dimensional article 18. For one embodiment, the temperature can be maintained in a range of 40 degrees Celsius to 60 degrees Celsius. In another embodiment, the temperature can be maintained in a range of 60 degree Celsius to 75 degrees Celsius. In yet other embodiments, the temperature can be maintained within a narrow selected range within the broader range of about 40 degrees Celsius to about 80 degrees Celsius. The selected temperature range is a function of the particular resin 42 being use to form the three-dimensional article 18 and the geometry of the three-dimensional article 18. There may be certain resins 42 that can tolerate higher temperatures for curing. In the illustrated embodiment, the light sources 162 generate heat that is used to elevate the temperature of the chambers 88. The light sources 162 can provide some or all of this heat.

During a cure process, a full support tray 16 with an attached three-dimensional article 18 is transported by the chain 94 through the entrance door 90EN. The three-dimensional article 18 begins to warm up and light from light sources 162 begins to impinge upon and cure the three-dimensional article 18. As the three-dimensional article 18 passes into the inner chambers 88M, the reduced oxygen and elevated temperature allow the light to rapidly cure the outer layers of the three-dimensional article 18. The cure process continues until the three-dimensional article 18 exits through the exit door 90EX.

In the illustrated embodiment, the resin cure module 22 is divided up into seven chambers 88. In other embodiments, the resin cure module 22 can be divided into fewer or more chambers 88. The gas supply 160 can inject gas into fewer or more chambers 88. In one embodiment, the more central chambers 88M can have a higher gas flow rate and the more peripheral chambers 88 (closer to entrance 90EN and exit 90EX doors) can have a lower gas flow rate so that the gas is always streaming from the center chambers 88M toward the peripheral chambers 88.

Figure 15:
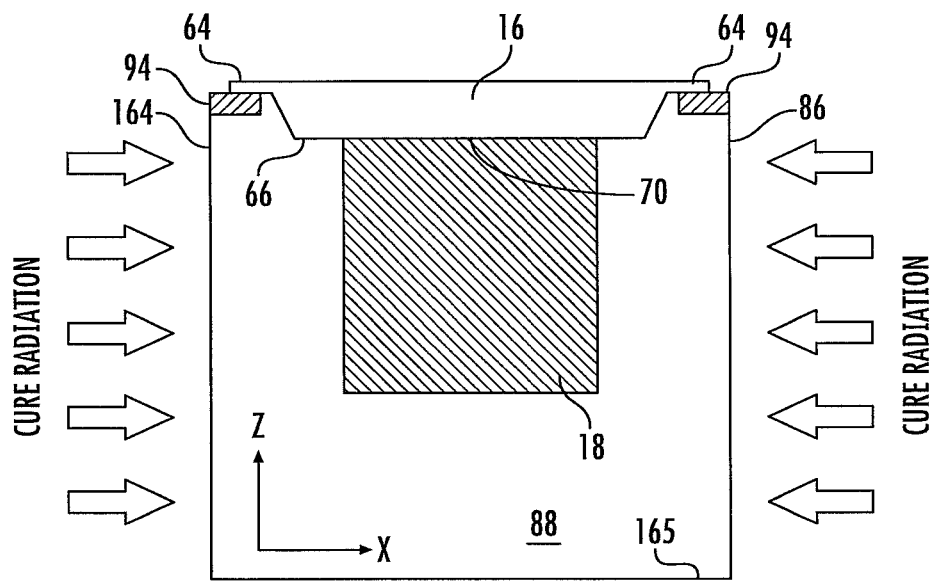
FIG. 15 is a simplified schematic cross section through a resin cure module taken along the lateral X axis.

FIG. 15 is a simplified schematic cross section through the resin cure module 22 taken along the lateral X axis. Side walls 164 of housing 86 are formed from a material that allows for efficient transmission of ultraviolet (UV) light from light sources 162 to pass to the chamber 88. In one embodiment, the side walls 164 are formed from a UV transmitting acrylic sheeting. In another embodiment, the side walls 164 are formed from glass. In some embodiments, the housing 86 can include reflective surfaces that reflect ultraviolet and blue light. In particular, top 163 and bottom 165 inside surfaces of the housing 86 have the reflective surfaces. Also, the light sources 162 can include ultraviolet and blue reflectors to direct radiation inwardly into the housing 86.

The entrance 90EN and exit 90EX doors can include ultraviolet and blue light reflectors or reflective coatings to maximize efficiency and to reduce light leakage from the housing 86. The internal doors 90IN can either be transmissive of blue and ultraviolet light or have the ultraviolet and blue light reflectors or reflective coatings.

In other embodiments of resin cure module 22, the light source 162 can have other locations. In one embodiment, the light source 162 can be located below chamber 88, passing the radiation generally upward. In another embodiment, the light source 162 can be located on one side or the other. In yet another embodiment, the light source 162 can include three light sources 162 that emit light from both sides (as per FIG. 15) and from below the chamber 88.

In yet other embodiments, the light sources 162 include banks of light emitting devices. The light emitting devices can be light emitting diodes (LEDs).

The specific embodiments and applications thereof described above are for illustrative purposes only and do not preclude modifications and variations encompassed by the scope of the following claims.

What is claimed:

1. A three-dimensional printing system having a three-dimensional printer for fabricating a three-dimensional article comprising:
 a housing for surrounding the three-dimensional article during a post-fabrication process, the housing having an air outlet and an air inlet;
 a blower including an inlet and an outlet, the outlet supplying pressurized air to the air inlet of the housing;
 a residue trap coupled between the housing air outlet and the inlet of the blower, wherein air circulates around a loop from the blower outlet, to the air inlet of the housing, out of the housing air outlet, through the residue trap, and to the inlet of the blower, and the residue trap is configured to remove liquid resin from resin laden air arriving from the housing air outlet and to output cleaned air to the inlet of the blower; and
 wherein the three-dimensional article is supported by a support tray, and the system further comprises a continuous transport mechanism configured to transport the support tray through the housing during the residue removal.

2. The system of claim 1 wherein the air inlet is coupled to an air emitting nozzle within the housing.

3. The system of claim 2 wherein the air emitting nozzle is configured to blow residue from the three-dimensional article.

4. The system of claim 1 wherein the blower is a regenerative blower including an impeller that rotates about an axis and the inlet and outlet direct air generally parallel to the axis of the impeller.

5. The system of claim 4 further comprising a variable frequency motor drive that provides power to the regenerative blower.

6. The system of claim 5 further comprising a temperature sensor that monitors a temperature of air being delivered to the air inlet of the housing and providing a signal to the variable frequency motor drive, the variable frequency motor drive modulates an angular velocity of the impeller based upon the signal.

7. The system of claim 1 further comprising a valve with an electronically controllable aperture that couples the outlet of the blower to the air inlet of the housing.

8. The system of claim 7 further comprising:
 a pressure sensor that generates a signal indicative of a pressure of air being delivered to the air inlet of the housing; and
 a controller that receives the signal and modulates the electronically controllable aperture in response.

9. The system of claim 1 further comprising a residue collection reservoir that receives residue from the residue trap.

10. The system of claim 9 further comprising a peristaltic pump that delivers residue from the residue trap to the residue collection reservoir.

11. A three-dimensional printing system comprising:
 a print engine subsystem configured to receive empty support trays and to output full support trays individually supporting fabricated three-dimensional articles; and
 a post-process module including:
  a housing having an air inlet and an air outlet;
  a continuous transport system configured to receive the full support trays and to transport them through the housing;
  a blower having an inlet and an outlet supplying pressurized air to the air inlet of the housing, and
  a residue trap coupled between the air outlet of the housing and the air inlet of the blower, wherein air circulates along a pathway from the outlet of the blower to the air inlet of the housing, out of the air outlet of the housing to the residue trap, and out of the residue trap to the inlet of the blower, and the residue trap is configured to clean liquid resin from resin laden air from the housing air outlet and to output cleaned air to the inlet of the blower.

12. The three-dimensional printing system of claim 11 wherein the blower is a regenerative blower including an impeller that rotates about an axis of rotation, the outlet generates air flow that is generally parallel to the axis of rotation.

13. The three-dimensional printing system of claim 12 further comprising a variable frequency motor drive that provides power to the regenerative blower.

14. The three-dimensional printing system of claim 13 further comprising a temperature sensor that monitors a temperature of air being delivered to the air inlet of the housing and providing a signal to the variable frequency motor drive, the variable frequency motor drive modulates an angular velocity of the impeller based upon the signal.

15. The system of claim 11 further comprising a valve with an electronically controllable aperture that couples the outlet of the blower to the air inlet of the housing.

16. The system of claim 15 further comprising:
 a pressure sensor that generates a signal indicative of a pressure of air being delivered to the air inlet of the housing; and a controller that receives the signal and modulates the electronically controllable aperture in response.

17. The system of claim 11 further comprising a residue collection reservoir that receives residue from the residue trap.

* * * * *